(12) United States Patent
Kothari et al.

(10) Patent No.: US 7,685,304 B2
(45) Date of Patent: Mar. 23, 2010

(54) WEB SERVICES MULTI-PROTOCOL SUPPORT

(75) Inventors: Pankaj Kothari, Bangalore (IN); Avinash Atreya, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 377 days.

(21) Appl. No.: 11/567,375

(22) Filed: Dec. 6, 2006

(65) Prior Publication Data

US 2008/0140861 A1    Jun. 12, 2008

(51) Int. Cl.
*G06F 15/16*    (2006.01)
*G06F 15/173*   (2006.01)

(52) U.S. Cl. .................. 709/230; 709/223; 709/228

(58) Field of Classification Search ................ 709/223, 709/224, 228, 230, 232, 246
See application file for complete search history.

(56) References Cited

U.S. PATENT DOCUMENTS

| | | | |
|---|---|---|---|
| 6,209,124 B1 * | 3/2001 | Vermeire et al. | 717/114 |
| 6,282,580 B1 * | 8/2001 | Chang | 719/316 |
| 6,442,559 B1 * | 8/2002 | Martinsen et al. | 707/102 |
| 6,615,212 B1 * | 9/2003 | Dutta et al. | 707/10 |
| 6,937,220 B2 * | 8/2005 | Kitaura et al. | 345/90 |
| 6,937,588 B2 * | 8/2005 | Park | 370/338 |
| 6,993,585 B1 * | 1/2006 | Starkovich et al. | 709/228 |
| 7,280,559 B2 * | 10/2007 | Arai | 370/466 |
| 7,487,110 B2 * | 2/2009 | Bennett et al. | 705/26 |

OTHER PUBLICATIONS

"Soap-Wikipedia, the free encyclopedia", www.wikipedia.org/wiki/soap, Aug. 17, 2006.
"XML-RPC-Wikipedia, the free encyclopedia", www.wikipedia.org/wiki/XML_RPC, Jun. 18, 2006.
"Representational State Transfer-Wikipedia, the free encyclopedia", www.wikipedia.org/wiki/Representational_State_Transfer, Aug. 16, 2006.
Asaravala "Give SOAP a REST", www.devx.com/DevX/Article/8155, copyright 2005.
"Chapter 5, Representational State Transfer (REST)", www.ics.uci.edu/~fielding/pubs/dissertation/rest_arch_style.htm, copyright 2000.

* cited by examiner

*Primary Examiner*—Hussein Elchanti
(74) *Attorney, Agent, or Firm*—Weaver Austin Villeneuve & Sampson LLP

(57) ABSTRACT

A solution is provided wherein a single service implementation may be exposed to users as two or more different web service protocols. The service then appears to the user to be utilizing a desired protocol even though the service itself is potentially operating under a different protocol. A gateway may be utilized that maintains mappings between the supported protocols. When a user sends a request to a particular service, the gateway may determine whether the request is in the format of the protocol utilized by the underlying web service. If not, the gateway may convert the format to match the correct protocol. An embodiment is also possible where a single endpoint is utilized for multiple services having multiple protocols. This may be coupled with an ability to detect a protocol automatically from request contents, thus seamlessly integrating multiple protocols into a user's experience.

21 Claims, 4 Drawing Sheets

WEB SERVICES MULTI-PROTOCOL SUPPORT

BACKGROUND OF THE INVENTION

1. Field of the Invention

The present invention relates to the field of web services. More specifically, the present invention relates to multi-protocol support for web services.

2. Description of the Related Art

The field of Web Services involves the creation and utilization of software systems designed to support interoperable machine-to-machine operation over a network (typically the World Wide Web, hence the name "Web Services"). There are a variety of different protocols utilized by various Web Services vendors and customers when operating these web services. Three of the most common Web Services protocols are Simple Object Access protocol (SOAP), Representational State Transfer (REST), and Extensible Markup Language Remote Procedure Call (XML-RPC).

In SOAP, XML-based messages are exchanged, typically using HyperText Transfer Protocol (HTTP). The use of XML can be both a benefit and a drawback. Its format is easy for humans to read and understand, but it can create slow processing times and the extra XML wrapper around every request and response can create bandwidth issues. Additionally, the use of SOAP requires the knowledge of a new XML specification, and many developers will need a SOAP toolkit to form requests and parse the results. In spite of these drawbacks, SOAP is currently the most commonly used Web Services protocol.

In REST, a Uniform Resource Identifier (URI) is utilized for the messaging. The most common type of URI is a Uniform Resource Locator (URL), which many users will recognize as the data located in a web address field of an Internet browser. For example, http://www.brokerage.com/quote?symbol=QQQ may be a URI in the REST protocol for issuing a request for a stock quote. REST has the advantage of the fact that any developer can figure out how to create and modify a URI to access different web services. The major disadvantage of REST is security, in that is can be dangerous to provide sensitive information as parameters in a URI. Despite this limitation, REST has been gaining momentum in comparison to SOAP.

XML-RPC is a predecessor of SOAP. Despite numerous improvements made by SOAP over XML-RPC, XML-RPC is still in use in many systems simply because many vendors have been slow to adopt newer protocols, a common occurrence in the computer industry.

Since it is common to see many different protocols utilized in various web services, it would be beneficial to provide a way for a single web service to be easily utilized by users familiar with any of the web services protocols, as opposed to limiting access to a particular web service to only those users familiar with the one particular protocol utilized by the web service.

In the past, the solution to this problem has been to provide different versions of the same web service for the various protocols. For example, the aforementioned stock quote web service might be implemented with a SOAP version, a REST version, and an XML-RPC version, and the user can simply select which version to access. This solution, however, requires additional programming and wastes resources. What is needed is a solution that avoids the drawbacks of the prior art.

SUMMARY OF THE INVENTION

A solution is provided wherein a single service implementation may be exposed to users as two or more different web service protocols. The service then appears to the user to be utilizing a desired protocol even though the service itself is potentially operating under a different protocol. A gateway may be utilized that maintains mappings between the supported protocols. When a user sends a request to a particular service, the gateway may determine whether the request is in the format of the protocol utilized by the underlying web service. If not, the gateway may convert the format to match the correct protocol. An embodiment is also possible where a single endpoint is utilized for multiple services having multiple protocols. This may be coupled with an ability to detect a protocol automatically from request contents, thus seamlessly integrating multiple protocols into a user's experience.

DETAILED DESCRIPTION OF SPECIFIC EMBODIMENTS

Figure 1:
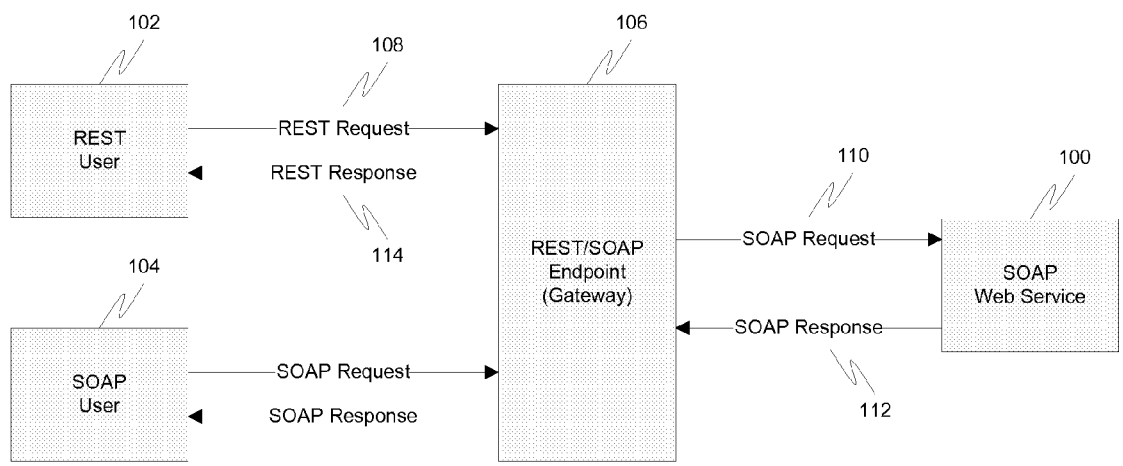
FIG. 1 is a block diagram illustrating a system for multi-protocol web services support in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

The present invention provides a single service implementation that may be exposed to users as two or more different web service protocols. The service then appears to the user to be utilizing a desired protocol even though the service itself is potentially operating under a different protocol. A gateway may be utilized that maintains mappings between the supported protocols. When a user sends a request to a particular service, the gateway may determine whether the request is in the format of the protocol utilized by the underlying web service. If not, the gateway may convert the format to match the correct protocol.

It should be noted that throughout this document, the term "gateway" shall be taken to mean any software or hardware (or combination thereof) that is able to intercept communications between clients and web services. While some implementations may locate the gateway physically between the client and the web service, there is no requirement that the physical location of the gateway be separate from either the client or the web service.

In an embodiment of the present invention, users may access a web service using either SOAP, REST, or XML-RPC requests. The web service may utilize only one of these three protocols. Nevertheless, embodiments are possible where different and/or additional protocols may be supported, and nothing in this document should be taken as limiting the scope of protection to the three protocols listed above, except where explicitly stated.

In an embodiment of the present invention, the user sends commands to the gateway as opposed to directly to the web service. As such, the gateway acts as a first endpoint of communications. It should be noted that the user may or may not be aware of the use of the gateway. In some embodiments, Uniform Resource Locator (URL) rewriting may be utilized to give the appearance to the user that he is directly accessing a web service using a particular protocol, when in fact his requests are being routed through the gateway, which converts the requests to a different protocol.

In order to perform the necessary conversions between protocols, in an embodiment of the present invention configurable mappings may be stored by the gateway. These mappings may include predefined portions and user-configurable portions. The predefined portions may contain mappings between commonly used commands. The user-configurable portions may contain mappings that a user has added on top of, or instead of, the predefined mappings. This may be particularly useful for rare commands that universal mappings may not contain, or commands that ordinarily have ambiguous conversions (i.e., can be theoretically converted correctly to two or more different commands), with the configurable mapping clearing up the ambiguity.

In an embodiment of the present invention, the gateway may "intercept" requests from and responses to the user in order to perform the translations. The term "intercept" is used loosely, however, since the user and web service may both be fully aware that the gateway exists and may be intentionally sending the requests and responses directly to the gateway.

FIG. 1 is a block diagram illustrating a system for multi-protocol web services support in accordance with an embodiment of the present invention. In this embodiment, a SOAP web service 100 is accessed. Two different users 102, 104 access the same web service 100, but each user interfaces with the web service using a different protocol. User 102 is a REST user, and as such the gateway 106 accesses mappings to convert the REST requests 108 into SOAP requests 110, as well as convert the corresponding SOAP responses 112 into REST responses 114. User 104, on the other hand, is a SOAP user. As such, gateway 106 does not need to perform a conversion when the user communicates with the SOAP web service 100.

Figure 2:
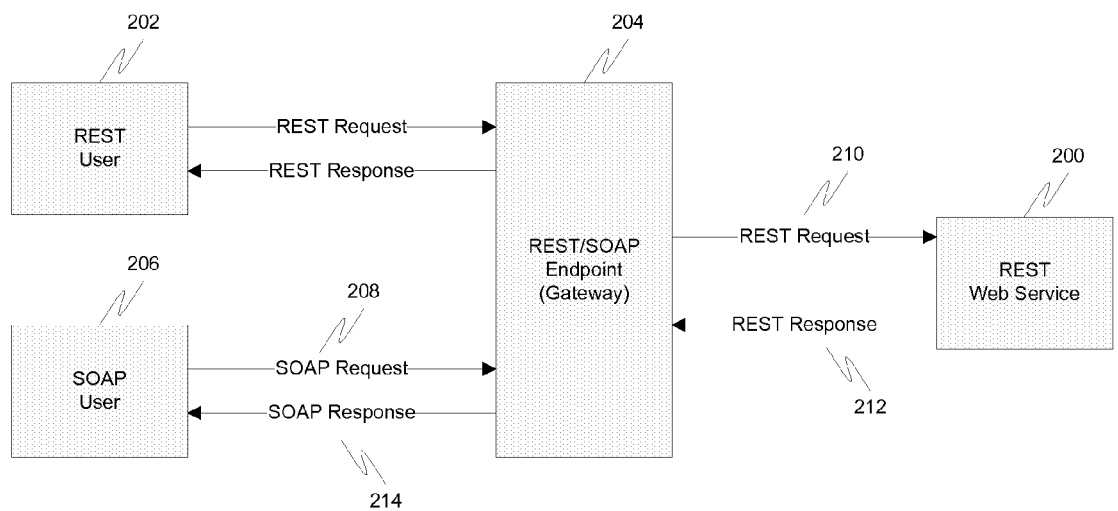
FIG. 2 is a block diagram illustrating a system for multi-protocol web services support in accordance with another embodiment of the present invention.

FIG. 2 is a block diagram illustrating a system for multi-protocol web services support in accordance with another embodiment of the present invention. In this embodiment, a REST web service 200 is accessed. User 202 is a REST user. As such, gateway 204 does not need to perform a conversion when the user communicates with the REST web service 200. User 206, on the other hand, is a SOAP user, and as such the gateway 108 accesses mappings to convert the SOAP requests 208 into REST requests 210, as well as convert the corresponding REST responses 212 into SOAP responses 214.

Figure 3:
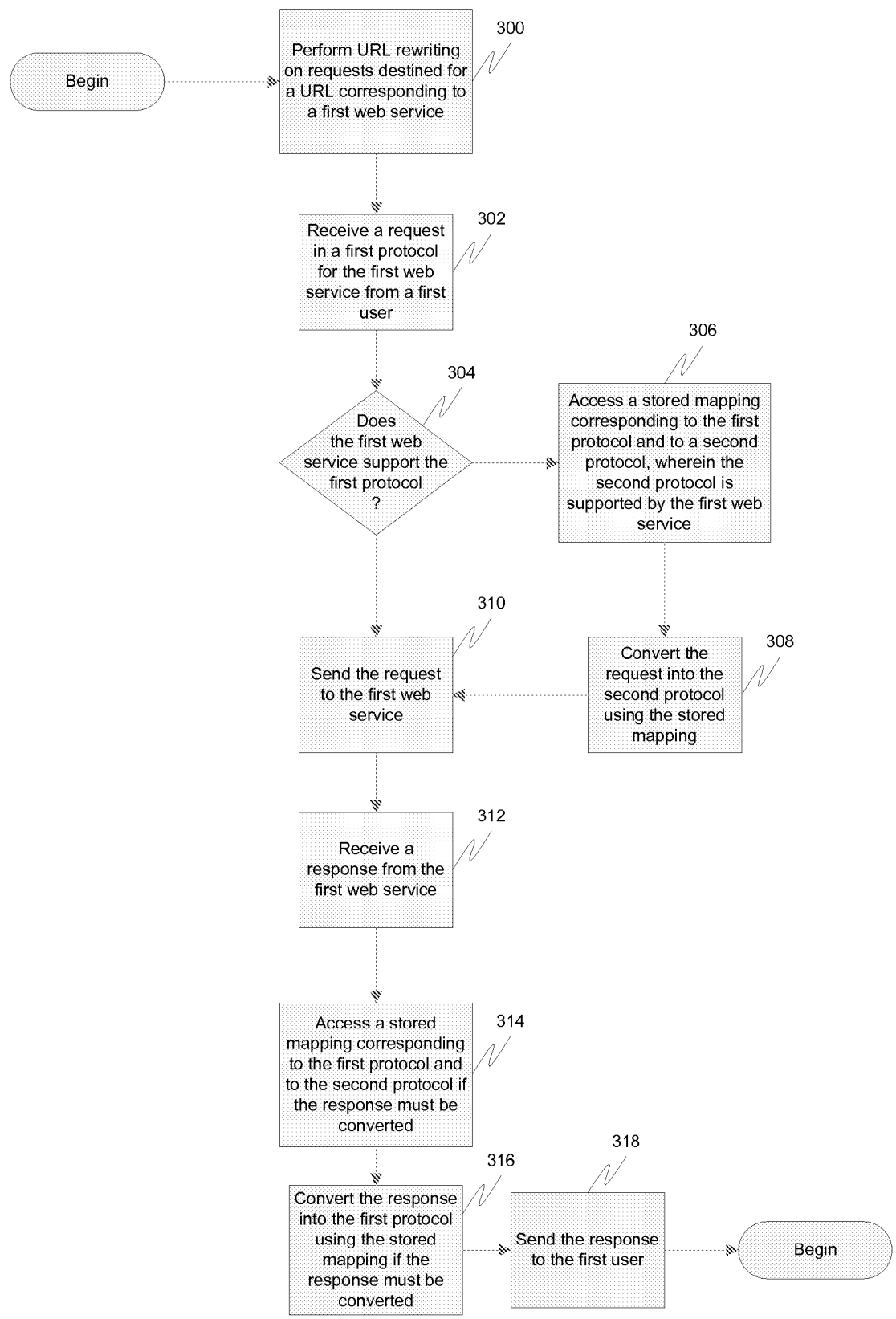
FIG. 3 is a flow diagram illustrating a method for multi-protocol web services support in accordance with an embodiment of the present invention.

FIG. 3 is a flow diagram illustrating a method for multi-protocol web services support in accordance with an embodiment of the present invention. The method may be performed by a gateway. At 300, URL rewriting may be performed on requests destined for a URL corresponding to a first web service. At 302, a request may be received in a first protocol for the first web service from a first user. At 304, it may be determined if the first web service supports the first protocol. If not, then at 306, a stored mapping corresponding to the first protocol and to a second protocol may be accessed, wherein the second protocol is supported by the first web service. The mapping may comprise a predefined portion and a user-configurable portion. Then at 308, the request may be converted into the second protocol using the stored mapping. Then, at 310, the request may be sent to the first web service. At some later time, at 312, a response in the second protocol may be received from the first web service. At 314, a stored mapping corresponding to the first protocol and to the second protocol may be accessed. It should be noted that this stored mapping may or may not be the same mapping as was accessed in 306. For example, there may be one mapping from REST to SOAP and a separate mapping from SOAP to REST. Alternatively, there may be one single mapping between REST and SOAP.

At 316, the response may be converted into the first protocol using the stored mapping. It should be noted that 314 and 316 only need to be performed if the protocol of response must be converted. If, for example, it was determined at 304 that the web service supports the first protocol, then it is likely that the responses from the web service would also be in the first protocol and thus 314 and 316 need not be performed. Then at 318, the response may be sent to the first user.

Figure 4:
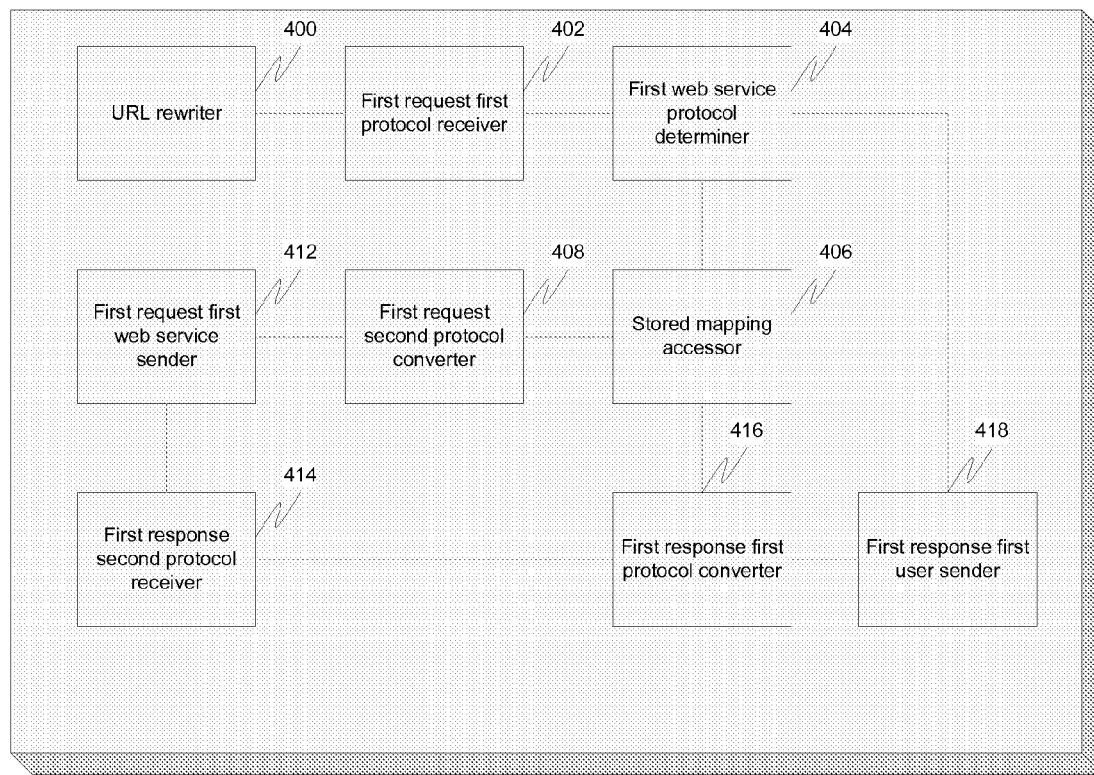
FIG. 4 is a block diagram illustrating an apparatus for multi-protocol web services support in accordance with an embodiment of the present invention.

FIG. 4 is a block diagram illustrating an apparatus for multi-protocol web services support in accordance with an embodiment of the present invention. The apparatus may be a gateway. A Uniform Resource Locator (URL) rewriter 400 may perform URL rewriting on requests destined for a URL corresponding to a first web service. A first request first protocol receiver 402 coupled to the URL rewriter 400 may receive a request in a first protocol for the first web service from a first user. A first web service protocol determiner 404 coupled to the first request first protocol receiver 402 may determine if the first web service supports the first protocol. If not, then a stored mapping accessor 406 coupled to the first web service protocol determiner 404 may access a stored mapping corresponding to the first protocol and to a second protocol, wherein the second protocol is supported by the first web service. The mapping may comprise a predefined portion and a user-configurable portion. Then a first request second protocol converter 408 coupled to the stored mapping accessor 406 may convert the request into the second protocol using the stored mapping. Then a first request first web service sender 410 coupled to the first request second protocol converter 408 may send the request to the first web service. At some later time, a first response second protocol receiver 412 coupled to the stored mapping accessor 406 may receive a response in the second protocol from the first web service. Then the stored mapping accessor 406 may access a stored mapping corresponding to the first protocol and to the second protocol. It should be noted that this stored mapping may or may not be the same mapping as was accessed before. For example, there may be one mapping from REST to SOAP and a separate mapping from SOAP to REST. Alternatively, there may be one single mapping between REST and SOAP.

A first response first protocol converter 416 coupled to the stored mapping accessor 406 may convert the response into the first protocol using the stored mapping. Then a first response first user sender 418 coupled to the first response first protocol converter 416 and to the first web service protocol determiner 404 may send the response to the first user.

Furthermore, in an embodiment of the present invention, multiple services (with multiple protocols) may have a single endpoint. This may be coupled with the ability to detect a protocol automatically from request contents. In such an embodiment, the system essentially seamlessly automates the use of multiple services while potentially hiding such details from the users.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for multi-protocol web services support, the method comprising:
    intercepting, at a gateway, a first request in a first web service protocol destined for a first web service from a first user;
    determining if the first web service supports the first web service protocol;
    if the first web service does not support the first web service protocol:
        accessing a stored mapping at the gateway corresponding to the first web service protocol and to a second web service protocol, wherein the second web service protocol is supported by the first web service, wherein the stored mapping includes a predefined portion and a user-configurable portion, wherein the predefined portion contains mappings between commonly used commands, and wherein the user-configurable portion contains mappings that a user has added on top of, or instead of, the mappings in the predefined portions; and
        converting the first request into the second web service protocol using the stored mapping; and
    sending the first request to the first web service.

2. The method of claim 1, further comprising:
    receiving a first response in the second web service protocol from the first web service;
    accessing a stored mapping corresponding to the first web service protocol and to the second web service protocol;
    converting the first response into the first web service protocol using the stored mapping; and
    sending the first response to the first user.

3. The method of claim 1, wherein the first and second web service protocols are protocols selected from the group consisting of: Simple Object Access Protocol (SOAP), Representational State Transfer (REST), and Extensible Markup Language Remote Procedure Call (XML-RPC).

4. The method of claim 1, wherein the method is performed by a gateway.

5. The method of claim 1, further comprising: performing Uniform Resource Locator (URL) rewriting on requests destined for a URL corresponding to the first web service.

6. The method of claim 1, further comprising:
    receiving a second request in the second web service protocol for the first web service from a second user; and
    sending the second request to the first web service without conversion.

7. The method of claim 1, further comprising:
    receiving a second request, in a third web service protocol, for a second web service from a second user;
    determining of the second web service supports the third web service protocol;
    if the second web service does not support the third web service protocol:
        accessing a second stored mapping corresponding to the third web service protocol and to a fourth web service protocol, wherein the fourth web service protocol is different than the second web service protocol and is supported by the second web service; and
        converting the request into the fourth web service protocol using the second stored mapping; and
    sending the second request to the second web service.

8. The method of claim 7, wherein the first web service and the second web service are accessed via a single endpoint.

9. An apparatus for multi-protocol web services support, the apparatus comprising:
    a processor configured to operate software modules comprising:
        a first request first protocol receiver;
        a first web service protocol determiner coupled to the first request first protocol receiver;
        a stored mapping accessor coupled to the first web service protocol determiner and configured to access a stored mapping corresponding to a first web service protocol and to a second web service protocol, wherein the second web service protocol is supported by a first web service, wherein the stored mapping includes a predefined portion and a user-configurable portion, wherein the predefined portion contains mappings between commonly used commands, and wherein the user-configurable portion contains mappings that a user has added on top of, or instead of, the mappings in the predefined portions;
        a first request second protocol converter coupled to the stored mapping accessor; and
        a first request first web service sender coupled to the first request second protocol converter and to the first web service protocol determiner.

10. The apparatus of claim 9, wherein the processor is further configured to operate software modules comprising:
    a first response second protocol receiver coupled to the stored mapping accessor;
    a first response first protocol converter coupled to the stored mapping accessor; and
    a first response first user sender coupled to the first response first protocol converter and to the first web service protocol determiner.

11. The apparatus of claim 9, wherein the apparatus is a gateway.

12. The apparatus of claim 9, wherein the apparatus is located on the same physical device as a first web service.

13. The apparatus of claim 9, further comprising a Uniform Resource Locator (URL) rewriter coupled to the first request first protocol receiver.

14. An apparatus for multi-protocol web services support, the apparatus comprising:
    means for intercepting, at a gateway, a first request in a first web service protocol destined for a first web service from a first user;

means for determining if the first web service supports the first web service protocol;
means for if the first web service does not support the first web service protocol:
    accessing a stored mapping at the gateway corresponding to the first web service protocol and to a second web service protocol, wherein the second web service protocol is supported by the first web service, wherein the stored mapping includes a predefined portion and a user-configurable portion, wherein the predefined portion contains mappings between commonly used commands, and wherein the user-configurable portion contains mappings that a user has added on top of, or instead of, the mappings in the predefined portions; and
    converting the first request into the second web service protocol using the stored mapping; and
means for sending the first request to the first web service.

15. The apparatus of claim 14, further comprising:
means for receiving a first response in the second web service protocol from the first web service;
means for accessing a stored mapping corresponding to the first web service protocol and to the second web service protocol;
means for converting the first response into the first web service protocol using the stored mapping; and
means for sending the first response to the first user.

16. The apparatus of claim 14, wherein the first and second web service protocols are protocols selected from the group consisting of: Simple Object Access Protocol (SOAP), Representational State Transfer (REST), and Extensible Markup Language Remote Procedure Call (XML-RPC).

17. The apparatus of claim 14, wherein the apparatus is a gateway.

18. The apparatus of claim 14, further comprising: means for performing Uniform Resource Locator (URL) rewriting on requests destined for a URL corresponding to the first web service.

19. The apparatus of claim 14, further comprising:
means for receiving a second request in the second web service protocol for the first web service from a second user; and
means for sending the second request to the first web service without conversion.

20. The apparatus of claim 14, further comprising:
means for receiving a second request in a third web service protocol for a second web service from a second user;
means for determining of the second web service supports the third web service protocol;
means for, if the second web service does not support the third web service protocol:
    accessing a second stored mapping corresponding to the third web service protocol and to a fourth web service protocol, wherein the fourth web service protocol is different than the second web service protocol and is supported by the second web service; and
    converting the request into the fourth web service protocol using the second stored mapping; and
means for sending the second request to the second web service.

21. The apparatus of claim 20, wherein the first web service and the second web service are accessed via a single endpoint.

\* \* \* \* \*